United States Patent
Niewiadomski et al.

(10) Patent No.: US 12,128,925 B2
(45) Date of Patent: Oct. 29, 2024

(54) VEHICLE OPERATION ALONG PLANNED PATH

(71) Applicant: Ford Global Technologies, LLC, Dearborn, MI (US)

(72) Inventors: Luke Niewiadomski, Dearborn, MI (US); Li Xu, Northville, MI (US); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 553 days.

(21) Appl. No.: 17/007,328

(22) Filed: Aug. 31, 2020

(65) Prior Publication Data
US 2022/0063671 A1 Mar. 3, 2022

(51) Int. Cl.
*B60W 60/00* (2020.01)
*B60W 30/09* (2012.01)
*B60W 30/095* (2012.01)
*G01C 21/34* (2006.01)

(52) U.S. Cl.
CPC ........ *B60W 60/0015* (2020.02); *B60W 30/09* (2013.01); *B60W 30/095* (2013.01); *G01C 21/3461* (2013.01); *B60W 2554/4029* (2020.02); *B60W 2554/80* (2020.02)

(58) Field of Classification Search
CPC ............. B60W 60/0015; B60W 30/09; B60W 30/095; B60W 2554/4029; B60W 2554/80; G01C 21/3461
See application file for complete search history.

(56) References Cited

U.S. PATENT DOCUMENTS

| 10,214,206 B2 | 2/2019 | Latotzki | |
|---|---|---|---|
| 2008/0211644 A1 * | 9/2008 | Buckley | G08G 1/165 340/932.2 |
| 2009/0045928 A1 * | 2/2009 | Rao | B60Q 9/006 340/435 |

(Continued)

FOREIGN PATENT DOCUMENTS

| EP | 2026099 A1 * | 2/2009 | ............. B60Q 9/006 |
|---|---|---|---|
| EP | 2701135 A1 * | 2/2014 | ............... B60Q 1/50 |
| GB | 2493446 B | 6/2013 | |

OTHER PUBLICATIONS

Huang, Po-Yuan, and Huei-Yung Lin. "Rear obstacle warning for reverse driving using stereo vision techniques." 2019 IEEE International Conference on Systems, Man and Cybernetics (SMC). IEEE, 2019. (Year: 2019).*

*Primary Examiner* — Russell Frejd
*Assistant Examiner* — Ana D Thomas
(74) *Attorney, Agent, or Firm* — Frank A. MacKenzie; Bejin Bieneman PLC

(57) ABSTRACT

For a vehicle at a first location, a blind zone is defined that is outside fields of view of available vehicle sensors. A path is determined that avoids the blind zone and moves the vehicle away from the first location. The path includes a straight portion having a first end at the first location, and a turning portion starting at a second end of the straight portion. The straight portion is defined such that, at the second end of the straight portion, the fields of view encompass the blind zone. The vehicle is determined to operate along the turning portion based on obtaining sensor data from the blind zone upon reaching the end of the straight portion.

20 Claims, 8 Drawing Sheets

(56) References Cited

U.S. PATENT DOCUMENTS

| | | | |
|---|---|---|---|
| 2010/0271237 A1* | 10/2010 | Reed | G01S 13/931 |
| | | | 340/932.2 |
| 2014/0028451 A1* | 1/2014 | Takahashi | G08G 1/168 |
| | | | 340/463 |
| 2016/0272244 A1* | 9/2016 | Imai | B62D 15/0285 |
| 2018/0194346 A1* | 7/2018 | Gesch | B60W 30/09 |
| 2018/0194349 A1* | 7/2018 | McGill, Jr. | B60W 60/0013 |
| 2018/0297588 A1* | 10/2018 | Cheaz | B60W 30/18 |
| 2019/0011913 A1* | 1/2019 | Chu | G05D 1/0246 |
| 2019/0193725 A1 | 6/2019 | Suzuki et al. | |
| 2019/0384302 A1* | 12/2019 | Silva | B60W 60/00272 |
| 2021/0197807 A1* | 7/2021 | Park | B60W 30/0956 |
| 2022/0017072 A1* | 1/2022 | Hayakawa | B60Q 1/507 |
| 2022/0348190 A1 | 11/2022 | Huger et al. | |

* cited by examiner

VEHICLE OPERATION ALONG PLANNED PATH

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
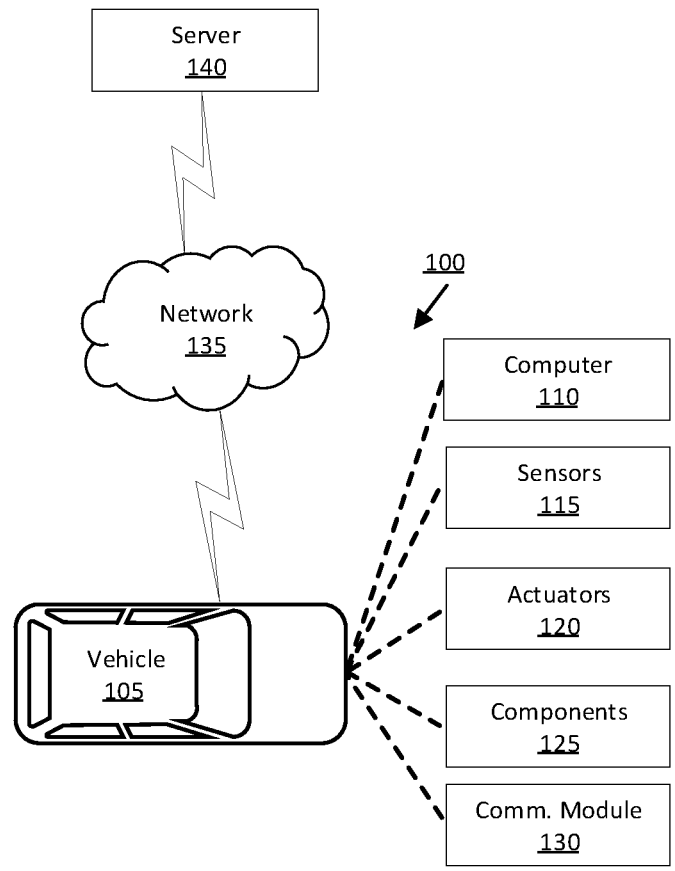
FIG. 1 is a block diagram illustrating an example vehicle control system for a vehicle.

A system includes a computer including a processor and a memory, the memory storing instructions executable by the processor to, for a vehicle at a first location, define a blind zone that is outside fields of view of available vehicle sensors. The instructions further include instructions to determine a path that avoids the blind zone and moves the vehicle away from the first location. The path includes a straight portion having a first end at the first location, and a turning portion starting at a second end of the straight portion. The straight portion is defined such that, at the second end of the straight portion, the fields of view encompass the blind zone. The instructions further include instructions to determine to operate the vehicle along the turning portion based on obtaining sensor data from the blind zone upon reaching the end of the straight portion.

The instructions can further include instructions to, upon detecting an object in the blind zone based on the sensor data, operate the vehicle to a stop.

The instructions can further include instructions to operate the vehicle along the path based on determining that the object has moved out of the blind zone.

The instructions can further include instructions to, upon determining the blind zone is unoccupied based on the sensor data, operate the vehicle along the turning portion.

The instructions can further include instructions to, upon detecting an object outside of the blind zone based on second sensor data, predict that a future location of the object will intersect the path. The instructions can further include instructions to determine an egress distance the vehicle has moved along the path. The instructions can further include instructions to then operate the vehicle (a) to a stop based on the egress distance being less than a first threshold, or (b) along the path based on the egress distance being greater than a second threshold, wherein the second threshold is greater than the first threshold.

The instructions can further include instructions to, upon determining the egress distance is between the first and second thresholds, move the vehicle (a) to a second location based on a distance from the object to the vehicle being within a specified distance, or (b) along the path based on the distance from the object to the vehicle being outside the specified distance.

The instructions can further include instructions to determine the second position based on an object adjacent to the blind zone.

The future location may be defined in part by a path of the object.

The object may be one of a vehicle or a pedestrian.

The instructions can further include instructions to determine the straight portion of the path based further on an object adjacent to the blind zone.

The instructions can further include instructions to determine the turning portion of the path based on a width of a travel route.

The instructions can further include instructions to determine the turning portion of the path based on a maximum steering angle of the vehicle.

The instructions can further include instructions to, upon determining the path, operate the vehicle along the straight portion of the path after a predetermined time.

A method includes, for a vehicle at a first location, defining a blind zone that is outside fields of view of available vehicle sensors. The method further includes determining a path that avoids the blind zone and moves the vehicle away from the first location. The path includes a straight portion starting at the first location, and a turning portion starting at an end of the straight portion. The straight portion is defined such that, at the end of the straight portion the fields of view encompass the blind zone. The method further includes determining to operate the vehicle along the turning portion based on obtaining sensor data from the blind zone upon reaching the end of the straight portion.

The method can further include, upon detecting an object in the blind zone based on the sensor data, operating the vehicle to a stop.

The method can further include operating the vehicle along the path based on determining that the object has moved out of the blind zone.

The method can further include, upon determining the blind zone is unoccupied based on the sensor data, operating the vehicle along the turning portion.

The method can further include, upon detecting an object outside of the blind zone based on second sensor data, predicting that a future location of the object will intersect the path. The method can further include determining an egress distance the vehicle has moved along the path. The method can further include operating the vehicle to (a) a stop based on the egress distance being less than a first threshold, or (b) along the path based on the egress distance being greater than a second threshold, wherein the second threshold is greater than the first threshold.

The method can further include, upon determining the egress distance is between the first and second thresholds, moving the vehicle (a) to a second location based on a distance from the object to the vehicle being within a specified distance, or (b) along the path based on the distance from the object to the vehicle being outside the specified distance.

The method can further include determining the second position based on an object adjacent to the blind zone.

Further disclosed herein is a computing device programmed to execute any of the above method steps. Yet further disclosed herein is a computer program product, including a computer readable medium storing instructions executable by a computer processor, to execute an of the above method steps.

A vehicle computer can generate a planned path and operate a vehicle along the planned path from a first location to a second location. The first location may also be referred to as a starting location, and the second location may also be referred to as a destination. While the vehicle is at the first location, fields of view of available vehicle sensors may define a blind zone around the vehicle within which the vehicle sensors cannot acquire data. An object may be in the blind zone and thus undetectable by the available sensors. Typically, the vehicle computer generates the planned path to avoid objects detected within the fields of view of the available sensors, which can cause the planned path to enter the blind zone and intersect undetected objects within the blind zone. Advantageously, the vehicle computer can generate a planned path away from the first location that avoids the blind zone, which can allow the vehicle computer to obtain sensor data of the blind zone after it moves from the first location, and can prevent the planned path from intersecting objects within the blind zone.

With reference to the figures, an example vehicle system 100 includes a vehicle 105. A vehicle computer 110 in the vehicle 105 receives data from sensors 115. The vehicle computer 110 is programmed to, for the vehicle 105 at a first location, define a blind zone 300 that is outside fields of view F of the sensors 115. The vehicle computer 110 is further programmed to determine a planned path P that avoids the blind zone 300 and moves the vehicle 105 away from the first location. The planned path P includes a straight portion $P_s$ having a first end at the first location, and a turning portion $P_t$ starting at a second end of the straight portion $P_s$. The straight portion $P_s$ is defined such that, at the second end of the straight portion $P_s$, the fields of view F of the sensors 115 encompass the blind zone 300. The vehicle computer 110 is further programmed to determine to operate the vehicle 105 along the turning portion $P_t$ based on obtaining sensor 115 data from the blind zone 300 upon reaching the end of the straight portion $P_s$.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a server 140 and/or the second vehicle 106, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 106, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a server 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object 310, e.g., a vehicle, a pole, a curb, a bicycle, a tree, a shrub, a pedestrian, etc., relative to the vehicle 105. As one example, the data may be image data of the environment around the vehicle 105. In such an example, the image data may include one or more objects around the vehicle 105. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component 125 (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, to a server 140 (typically via direct radio frequency communications), and/or (typically via the network 135) to a second vehicle. The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The server 140 can be a conventional computing device, i.e., including one or more processors and one or more memories, programmed to provide operations such as disclosed herein. Further, the server 140 can be accessed via the network 135, e.g., the Internet or some other wide area network.

Figure 2:
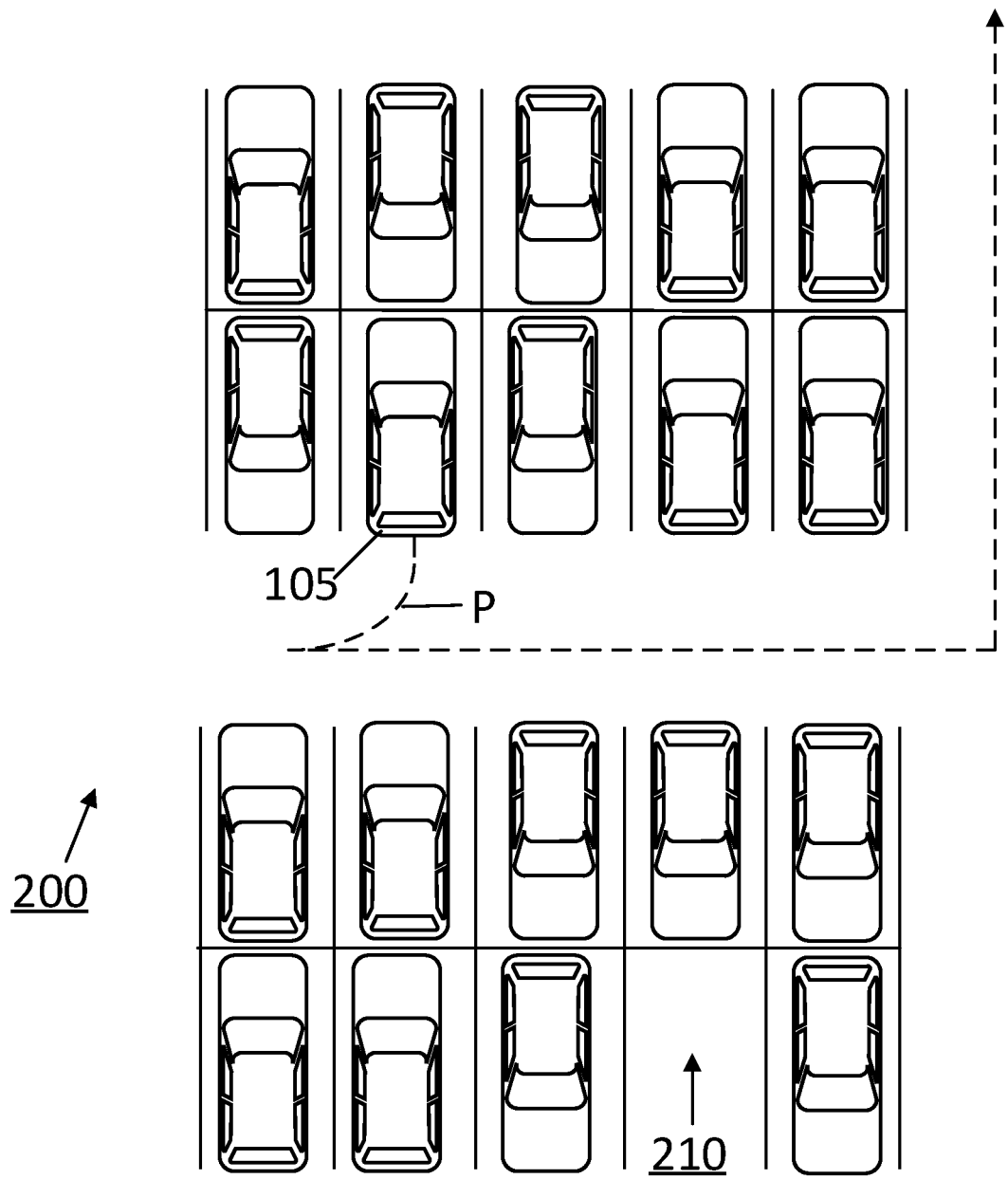
FIG. 2 is a diagram illustrating operating the vehicle according to the system of FIG. 1.

FIG. 2 is a diagram illustrating a vehicle 105 operating in an example ground surface area 200 that includes marked sub-areas 210 (e.g., parking spaces) for vehicles. An area 200 may be on a street or road, e.g., a defined parking area alongside a curb or an edge of the street, a parking lot or structure or portion thereof, etc. The vehicle computer 110 may be programmed to determine the vehicle 105 is within the area 200 by, e.g., GPS-based geo-fencing. In such an example, the GPS geo-fence specifies a perimeter of the area 200. The vehicle computer 110 can then determine the vehicle 105 is within the area 200 based on the location data of the vehicle 105 indicating the vehicle 105 is within the geo-fence. A sub-area 210 may, for example, be a parking space indicated by conventional markings, e.g., painted lines on a ground surface, and conventional image recognition techniques can be employed by the vehicle computer 110 to identify the sub-area 210.

The vehicle computer 110 can be programmed to determine the vehicle 105 is in a sub-area 210, e.g., stopped or parked in the sub-area 210. For example, the vehicle computer 110 can compare a location of the vehicle 105, e.g., based on image data, GPS data, etc., to the sub-area 210. As another example, the vehicle computer can analyze sensor 115 data, e.g., image data to determine the vehicle 105 is approximately centered laterally and longitudinally relative to the sub-area 210, e.g., based on conventional markings indicating a parking space.

While the vehicle 105 is in a sub-area 210, the vehicle computer 110 can receive sensor 115 data, e.g., image data, of the environment around the vehicle 105 in the sub-area 210. The image data can include one or more objects 310 around the vehicle 105 in the sub-area 210. For example, the vehicle computer 110 can be programmed to classify and/or identify object(s) 310 based on sensor 115 data. For example, object classification techniques can be used, e.g., in the vehicle computer 110 based on lidar sensor 115 data, camera sensor 115 data, etc., to classify a detected object 310 as movable or stationary, i.e., non-movable. Additionally, or alternatively, object identification techniques can be used, e.g., in the vehicle computer 110 based on lidar sensor 115 data, camera sensor 115 data, etc., to identify a type of object 310, e.g., a vehicle, a pedestrian, a drone, etc., as well as physical features of objects. Non-limiting examples of objects 310 include a pedestrian, another vehicle, a bicycle, a shopping cart, a pole, etc.

Various techniques such as are known may be used to interpret sensor 115 data and/or to classify objects 310 based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects 310 or an indication that no object 310 is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of objects 310 identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

The vehicle computer 110 can, for example, generate a planned path P to operate the vehicle 105 in the area 200. Alternatively, the server 150 can generate the planned path P and provide the planned path P to the vehicle computer 110, e.g., via the network 135. As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path P can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation speed and acceleration including positions in x, y, z, yaw, pitch, roll, yaw rate, pitch rate, roll rate, heading velocity and heading acceleration that can be determined by fitting a polynomial function to successive 2D locations included in vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \qquad (1)$$

where $a_0$ an offset, i.e., a lateral distance between the path and a center line of the vehicle 101 at the upcoming distance x, $a_1$ is a heading angle of the path, $a_2$ is the curvature of the path, and $a_3$ is the curvature rate of the path.

Figure 3A:
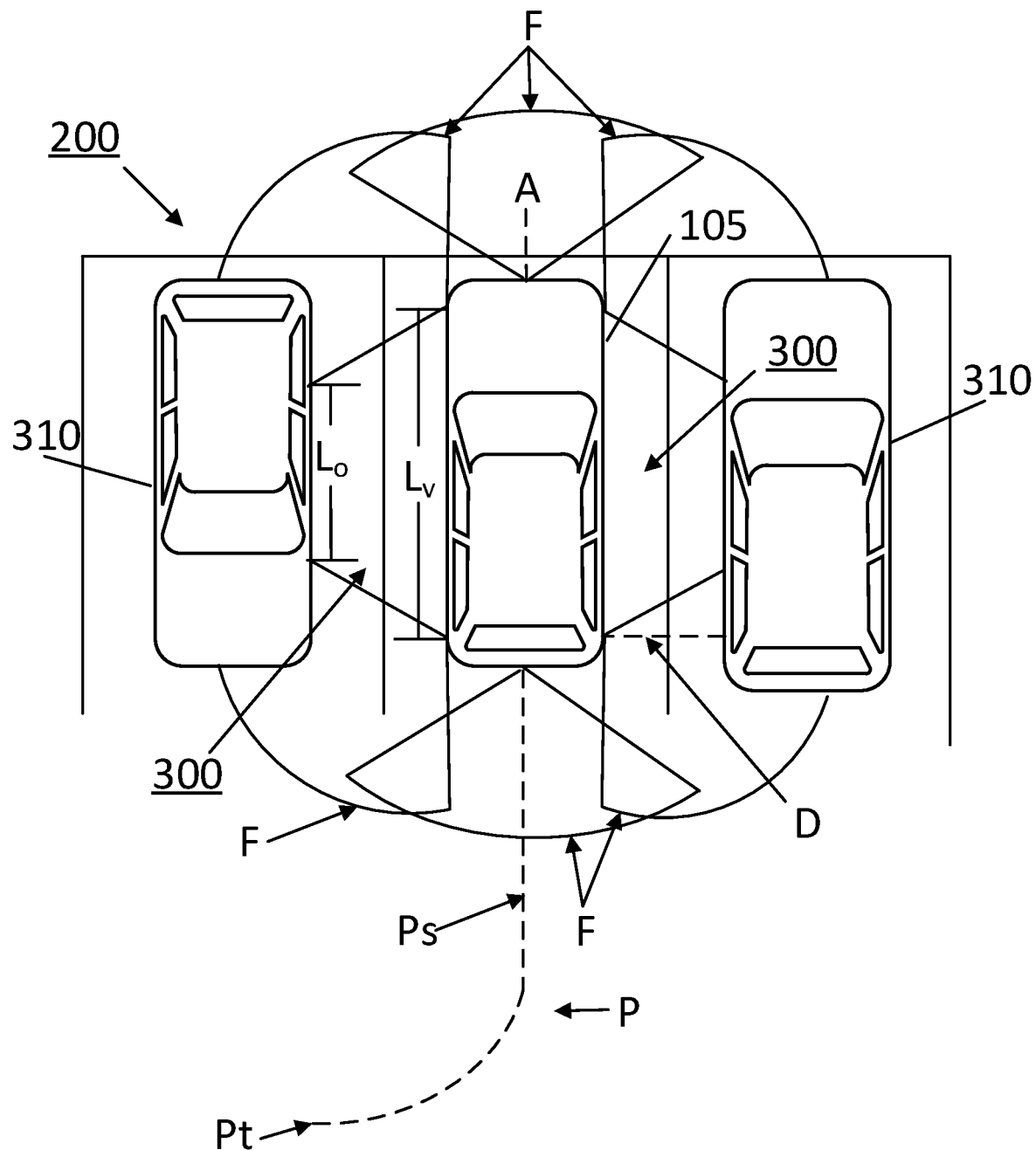
FIG. 3A is a diagram illustrating determining a blind zone for the vehicle in a first location.

Turning now to FIG. 3A, the vehicle computer 110 can determine a first location of the vehicle 105. The vehicle computer 110 may determine the first location, e.g., GPS (Global Positioning System) location coordinates, of the vehicle 105 relative to a coordinate system, e.g., based on data received from GPS sensor 115. Alternatively, the vehicle computer 110 can receive the first location of the vehicle 105 from the server 140, e.g., via the network 135. The vehicle computer 110 can store the first location, e.g., in a memory.

While the vehicle 105 is at the first location, e.g., parked in a sub-area 210, the vehicle computer 110 can generate the planned path P to direct the vehicle 105 out of the sub-area 210, i.e., away from the first location, along a travel route to depart the area 200. As used herein, a "travel route" specifies an area of the ground surface designated for vehicle movement in the area 200, e.g., aisles along which sub-areas 210 are located. The travel route can include two lanes, i.e., specified areas of the travel route for vehicle travel, that provide for vehicle travel in opposing directions along the travel route.

The vehicle computer 110 can, for example, identify a travel route based on sensor 115 data. In such an example, the vehicle computer 110 can detect one or more indicators of a travel route, e.g., via image data. The indicators can include signs, markings on the ground surface, movement of vehicles along the route, etc. As another example, the vehicle computer 110 can identify a travel route based on map data of the area 200 (e.g., stored in the memory or received from the server 140).

A planned path P includes a straight portion $P_s$ and a turning portion $P_t$. Each of the straight portion $P_s$ and the turning portion $P_t$ are segments that are some but less than all of the planned path P. The straight portion $P_s$ extends from a first end to a second end. The turning portion $P_t$ extends from the second end of the straight portion $P_s$ along the travel route. The first end of the straight portion $P_s$ is at the first location. The second end of the straight portion $P_s$ is spaced from the first end along a longitudinal axis A of the vehicle 105. That is, the straight portion $P_s$ has a length extending along the longitudinal axis A of the vehicle 105 from the first end to the second end.

The vehicle computer 110 is programmed to determine the length of the straight portion $P_s$ based on a blind zone 300 around the vehicle 105 at the first location. The vehicle computer 110 can define the blind zone 300 for the vehicle 105 at the first location based on sensor 115 data. For example, the vehicle computer 110 can define the blind zone 300 based on fields of view F of the sensors 115. For example, sensors 115 may be mounted to a rear, front, and/or a side of the vehicle 105 exterior. Respective fields of view F of each of one or more sensors 115 may partially overlap. In the present context, a blind zone 300 is an area or, more typically, a three-dimensional space, i.e., a volume, outside a field of view F of each of the sensors 115, i.e., an area or volume from which a sensor 115 cannot obtain data. A shape or boundaries of a blind zone 300 is typically defined by a body of the vehicle 105 and one or more fields of view F that surround and/or abut the blind zone. When the vehicle 105 is at the first location, an object 310 may define a portion of the blind zone, as shown in FIG. 3A. The fields of view F of the sensors 115 may be determined empirically, e.g., based on fields of view F required to perform one or more vehicle 105 functions. The vehicle computer 110 may store the fields of view F of each of the sensors 115, e.g., in a memory.

The vehicle computer 110 can determine the length of the straight portion P$_s$ as at least equal to a length of the blind zone 300. By determining the length of the straight portion P$_s$ as at least equal to the length of the blind zone 300, the fields of view F of the sensors 115 encompass the blind zone 300 for the vehicle 105 at the first location when the vehicle 105 is at the second end of the straight portion P$_s$ (see FIG. 3B). That is, while the vehicle 105 moves along the straight portion P$_s$, the vehicle computer 110 can obtain sensor 115 data of the blind zone 300 as the fields of view F of at least some sensors 115 move through the blind zone 300 for the vehicle 105 at the first location.

Figure 3B:
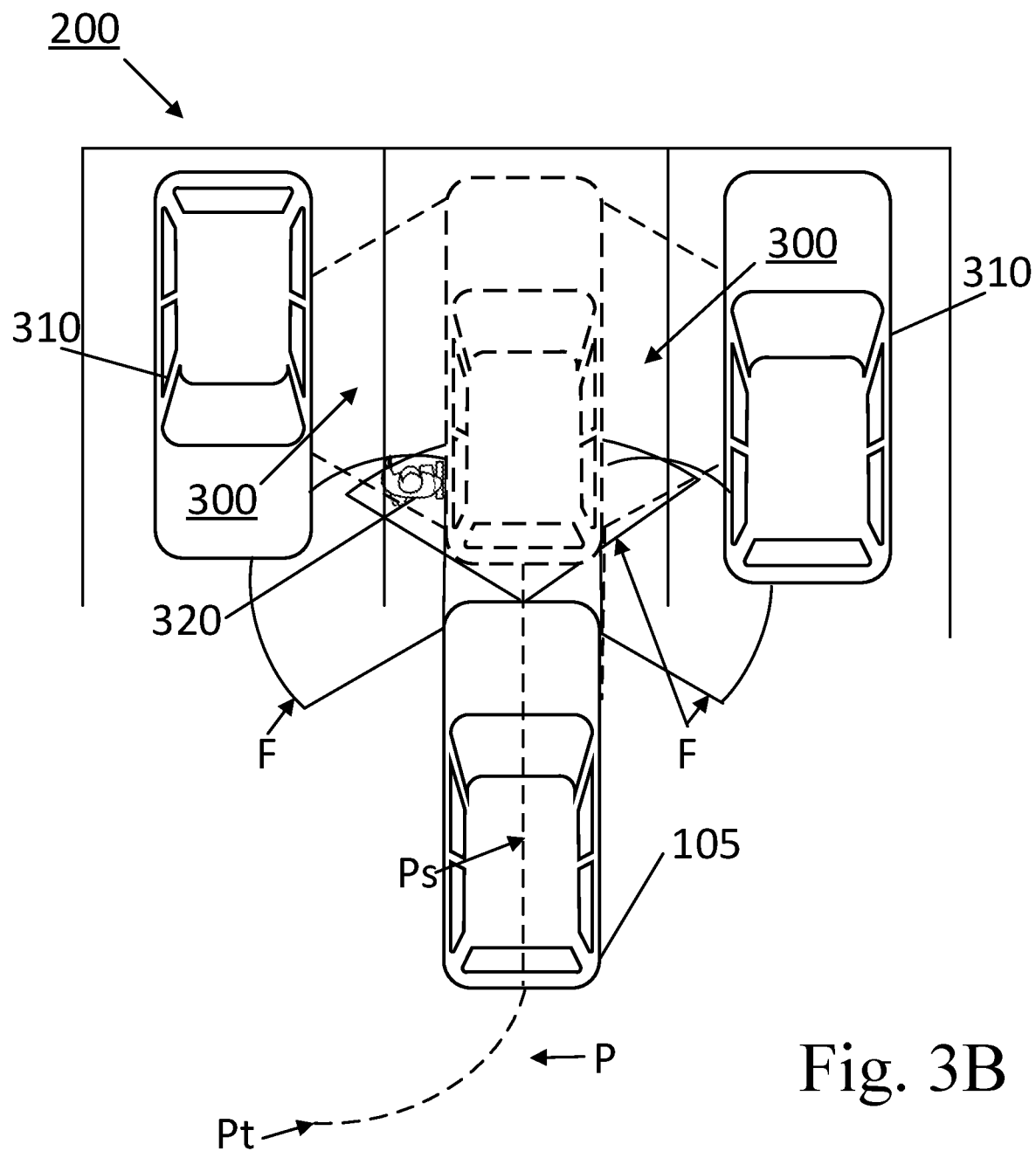
FIG. 3B is a diagram illustrating operating the vehicle to an end of a straight portion of a planned path.

A length of the blind zone 300 is a distance along a boundary of the blind zone 300 that extends parallel to the longitudinal axis A of the vehicle 105. A blind zone 300 may have one or more boundaries extending parallel to the longitudinal axis A of the vehicle 105 (see FIGS. 3A-3B), e.g., due to the fields of view F of the sensors 115 intersecting objects 310 around the vehicle 105. For example, the blind zone 300 may include a boundary along the vehicle 105 and a boundary along an object 310, as shown in FIGS. 3A and 3B. The vehicle computer 110 can determine the length L$_v$, L$_o$ of each blind zone 300 boundary. For example, the vehicle computer 110 can determine the length L$_v$ of the boundary along the vehicle 105 based on a longitudinal distance (e.g., stored in a memory) between vehicle 105 sensors 115 having fields of view F at least partially defining the blind zone 300.

Additionally, the vehicle computer 110 may determine the length L$_o$ of the boundary along the object 310 based on sensor 115 data. For example, the vehicle computer 110 can employ free space computation techniques to image data that identifies a range of pixel coordinates associated with an object 310 spaced laterally from the vehicle 105 and free space (i.e., space in which no object is detected) between the vehicle 105 and the object 310. By identifying a set of pixel coordinates in an image associated with the free space and the object 310 and determining a distance (in pixel coordinates) from an image sensor 115 lens, e.g., across the free space, to the identified object 310 pixel coordinates, the vehicle computer 110 can then determine a distance, e.g., across the free space, of the image sensor 115 lens from the object 310. That is, according to known techniques, the vehicle computer 110 can determine a distance from the lens to the identified coordinates (in pixel coordinates) and can further determine, from the image an angle between a line from the sensor 115 lens to a point on the identified object 310, which is on the edge of the field of view F of the respective sensor 115, and an axis extending from the lens parallel to the longitudinal axis A of the vehicle 105. Then, using trigonometric functions based on (i) a line extending from the sensor 115 lens to the point on the object 310, (ii) a line extending from the sensor 115 lens along the axis, and (iii) a line that intersects the point on the object and with which the line extending along the axis forms a right angle, the vehicle computer 110 can determine a length of the line drawn parallel to the vehicle 105 longitudinal axis A from (a) an axis extending from the sensor 115 lens parallel to a lateral axis of the vehicle 105 to (b) the point on the object 310. By repeating this process for the other sensor 115 and summing the lengths of two lines parallel to the vehicle 105 longitudinal axis A and drawn from the axis extending from the respective sensor 115 lens parallel to the lateral axis of the vehicle 105 to the respective points on the object 310, a coverage length along the object 310 may be determined. The vehicle computer 110 can then determine the length L$_o$ of the boundary along the object 310 based on the difference between the coverage length and the distance between vehicle 105 sensors 115 having fields of view F at least partially defining the blind zone 300, i.e., the length L$_v$ of the boundary along the vehicle 105.

The vehicle computer 110 can then compare the lengths L$_v$, L$_o$ of the boundaries to determine the maximum length of the blind zone 300. The maximum length of the blind zone 300 is the length of the boundary that is the greatest among the respective lengths L$_v$, L$_o$. The vehicle computer 110 then determines the length of the straight portion P$_s$ is at least equal to the maximum length of the blind zone 300.

The vehicle computer 110 can further determine the length of the straight portion P$_s$ of the planned path P based on parameters of the vehicle 105, e.g., dimensions (e.g., height, length, width), a turning radius, a wheelbase, etc., one or more objects 310 around the vehicle 105 detected via sensor 115 data while the vehicle 105 is at the first location, e.g., a parked position in a sub-area 210, and a travel direction in the travel route. The parameters of the vehicle 105 may be stored, e.g., in a memory of the vehicle computer 110. Based on the parameters of the vehicle 105, the vehicle computer 110 can identify a terminal point on the vehicle 105. The terminal point on the vehicle 105 is a farthest point from a center defining a minimum turning radius of the vehicle 105.

The vehicle computer 110 can, for example, determine a type of the object 310 based on output from the classifier, as discussed above. The vehicle computer 110 can then determine one or more object 310 dimensions based on the type of the object 310. For example, the vehicle computer 110 may store, e.g., in a memory, a look-up table or the like, data that associates object dimensions with a type of object. Based on the dimensions of the object 310 and/or sensor 115 data, the vehicle computer 110 can identify a terminal point on the object 310. The terminal point is a point that is the shortest straight-line distance from the vehicle 105.

The travel direction of the vehicle 105 may be one of to the right or to the left relative to the sub-area 210. The vehicle computer 110 may select one of a first lane or a second lane of the travel route within which to operate the vehicle 105 based on the travel direction. The first lane is between the sub-area 210 and the second lane. The first lane may partially define the sub-area 210, and the second lane may partially define other sub-areas 210 on the opposite side of the travel route as the sub-area 210.

When the travel direction of the vehicle 105 is to the left, the vehicle computer 110 selects the first lane. In this situation, the vehicle computer 110 determines a minimum longitudinal distance D$_y$ between the terminal point on the object 310 and a rear wheel of the vehicle 105. The vehicle computer 110 determines the minimum longitudinal distance D$_y$ by determining a turning radius R of the terminal point on the vehicle 105:

$$R = \sqrt{\left(\left(r_{min} + \left(\frac{w_v}{2}\right)\right)^2 + (w_b + L_f)^2\right)} \quad (2)$$

where $r_{min}$ is a minimum turning radius of the vehicle 105, $w_v$ is a width of the vehicle 105, $w_b$ is a distance between a front axle and a rear axle of the vehicle 105, i.e., length of a wheel base, and $L_f$ is a distance along the longitudinal axis L of the vehicle 105 from the front axle to a front terminal edge of the vehicle 105.

The vehicle computer 110 can then determine the minimum longitudinal distance D$_y$ according to equation 3 below:

$$D_y = \sqrt{\left(R^2 - \left(r_{min} + \left(\frac{w_v}{2}\right) + D_x\right)^2\right)} \quad (3)$$

where $D_x$ is a lateral distance between the vehicle 105 and the object 310. The vehicle computer 110 can determine the lateral distance $D_x$ between the vehicle 105 at the first location and the object 310 based on sensor 115 data. For example, the vehicle computer 110 can determine the lateral distance $D_x$ based on free space computation techniques, as set forth above. As another example, a lidar sensor 115 can emit a light beam and receive a light beam reflected from an object 310. The vehicle computer 110 can measure a time elapsed from emitting the light beam to receiving the reflected light beam. Based on the time elapsed and the speed of light, the vehicle computer 110 can determine the lateral distance $D_x$ between the vehicle 105 and the object 310.

When the travel direction of the vehicle 105 is to the right, the vehicle computer 110 selects the second lane. In this situation, the vehicle computer 110 can determine the minimum longitudinal distance $D_y$ according to equation 4 below:

$$D_y = r_{min} + \left(\frac{w_v}{2}\right) + D_c - w_t \quad (4)$$

where $D_c$ is a distance threshold between the vehicle 105 and a boundary of the travel route that partly defines the second lane, and $w_t$ is a width of the travel route. The boundary of the travel route may be partly defined by an object, e.g., another vehicle, a curb, a rail, etc., or conventional lane markings, i.e., painted lines on the ground. The vehicle computer 110 can determine the width of the travel route based on sensor 115 data. For example, when the vehicle 105 is at the first location, a lidar sensor 115 can emit a light beam and receive a light beam reflected from an object in a sub-area 210 on the opposite side of the travel route as the vehicle 105, i.e., longitudinally spaced from the vehicle 105 by the travel route. The vehicle computer 110 can measure a time elapsed from emitting the light beam to receiving the reflected light beam. Based on the time elapsed and the speed of light, the vehicle computer 110 can determine the distance between the vehicle 105 and the object. The distance threshold may be determined empirically, e.g., based on a minimum distance at which the vehicle computer 110 can operate the vehicle 105 based on a type of object, e.g., another vehicle, a curb, a rail, etc., partly defining the boundary of the travel route.

The vehicle computer 110 can then determine the length of the straight portion $P_s$ is at least equal to the sum of the length $L_v$, $L_o$ of the blind zone and the minimum longitudinal distance $D_y$. The vehicle computer 110 can generate the straight portion $P_s$ of the planned path P, e.g., using a conventional path planning algorithm, based on the first location and the length of the straight portion $P_s$. That is, the vehicle can generate a planned path P out of the sub-area 210 that avoids the blind zone 300.

As set forth above, the turning portion $P_t$ extends from the second end of the straight portion $P_s$ along the travel route. The turning portion $P_t$ extends from a first end to a second end spaced from the first end. The first end of the turning portion $P_t$ is at the second end of the straight portion $P_s$. The vehicle computer 110 determines the turning portion $P_t$ based on the parameters of the vehicle 105. Specifically, the vehicle computer 110 determines the turning portion $P_t$ based on a maximum steering angle for the vehicle 105. That is, the vehicle computer 110 determines the turning portion $P_t$ such that the vehicle computer 110 can maintain the vehicle 105 along the turning portion $P_t$ of the planned path P while operating the vehicle 105 at the maximum steering angle. A "steering angle" is an angle defined between an axis extending longitudinally through a center of one front wheel of a vehicle and a longitudinal axis of the vehicle. By determining the turning portion $P_t$ based on the maximum steering angle, the vehicle computer 110 can operate the vehicle 105 along the minimum turning radius of the vehicle 105, which can limit an amount of time that the vehicle 105 is impeding another lane of the travel route.

Turning now to FIG. 3B, the vehicle computer 110 may be programmed to actuate one or more vehicle components 125 to operate the vehicle 105 along the straight portion $P_s$ of the planned path P out of the sub-area 210. For example, the vehicle computer 110 can actuate one or more host vehicle components 125, e.g., a propulsion component, a steering component, etc., to move the vehicle 105 along the straight portion $P_s$ of the planned path P. The vehicle computer 110 may be programmed to operate the vehicle 105 along the straight portion $P_s$ after a predetermined time. The predetermined time may be determined empirically, e.g., based on a minimum amount of time for the vehicle computer 110 to receive and analyze sensor 115 data of the environment around the vehicle 105.

While the vehicle 105 is operating along the straight portion $P_s$ of the planned path P, the vehicle computer 110 can receive sensor 115 data, e.g., image data, of the blind zone 300 for the vehicle 105 at the first location. The image data can include an object 320 that is in the blind zone and was previously undetected. The vehicle computer 110 can the determine whether the blind zone 300 is occupied or unoccupied based on sensor 115 data indicating a presence or absence of an object 320 in the blind zone 300. For example, the vehicle computer 110 can identify a moveable object 320 in the blind zone 300 based on output from the classifier, as discussed above. If a moveable object 320 is in the blind zone 300, i.e., the blind zone 300 is occupied, then the vehicle computer 110 actuates one or more vehicle components 125 to stop the vehicle 105. If a moveable object 320 is not in the blind zone 300, i.e., the blind zone 300 is unoccupied, then the vehicle computer 110 can operate the vehicle 105 along the turning portion $P_t$ of the planned path P. For example, the vehicle computer 110 can provide a torque to rotate a steering wheel corresponding to the maximum steering angle of the front wheels of the vehicle 105, e.g., based on a steering ratio (i.e., the ratio of an angle change of the steering wheel to an angle change of the front wheels).

Upon stopping the vehicle 106, the vehicle computer 110 can determine whether the moveable object 320 has moved out of the blind zone 300. The vehicle computer 110 can, for example, compare a location of the movable object 320, e.g., obtained via image data, to the planned path P of the vehicle 105. In the case that the movable object 320 has moved and is not intersecting the planned path P, the vehicle computer 110 can operate the vehicle 105 along the planned path P. In the case that the movable object 320 has not moved, i.e., is intersecting the planned path P, the vehicle computer 110 maintains the vehicle 105 in the current, i.e., stopped, position.

Figure 4:
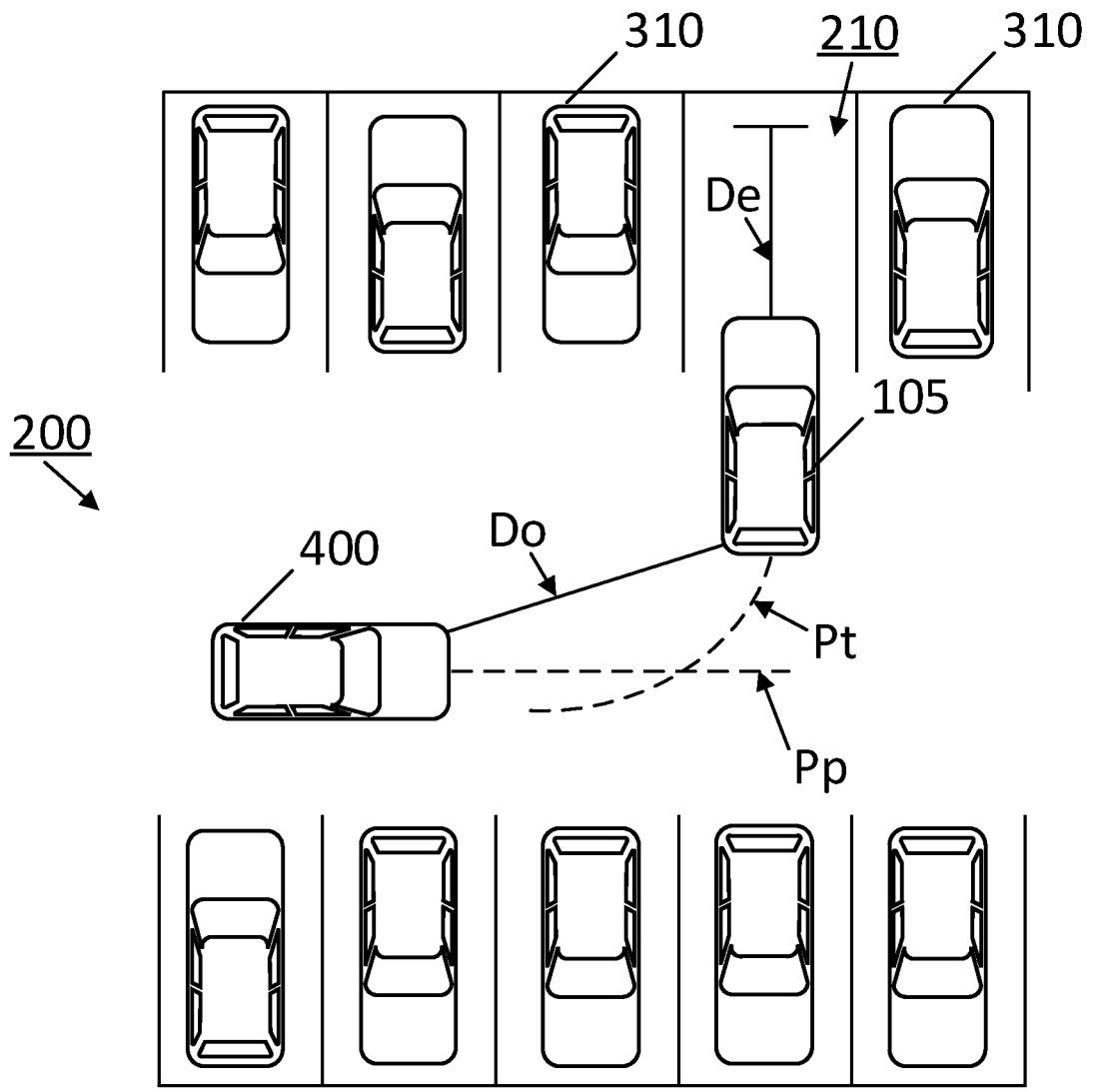
FIG. 4 is a diagram of a distance between the vehicle and an object based on a future location of the object intersecting the planned path of the vehicle.

Turning now to FIG. 4, while the vehicle 105 is operating along the planned path P away from the first location, the vehicle computer 110 can receive second sensor 115 data, e.g., second image data, of the environment outside the blind zone 300 of the vehicle 105 at the first location. For example, the second image data can include an object 400 in the travel route. The vehicle computer 110 can then identify the object 400 as moveable or stationary, e.g., based on output from the classifier, as discussed above.

Upon identifying a moveable object 400 in the travel route, i.e., outside of the blind zone 300, the vehicle computer 110 can be programmed to predict whether a future location of the moveable object 400 will intersect the planned path P of the vehicle 105. The vehicle computer 110 can predict the future location of the moveable object 400 based on the second sensor 115 data. That is, the predicted future location of the moveable object 400 is determined at least in part by a predicted path Pp of the moveable object 400. For example, the vehicle computer 110 can determine a predicted path Pp of the movable object 400 based on identifying a direction of movement of the moveable object 400 via the second sensor 115 data, e.g., sequential frames of image data. The vehicle computer 110 can then compare the predicted path Pp of the moveable object 400 to the planned path P of the vehicle 105.

As another example, the vehicle computer 110 can determine that the moveable object 400 is stationary (e.g., stopped to allow the vehicle 105 to depart the sub-area 210) based on the second sensor 115 data, e.g., sequential frames of image data. In such an example, the vehicle computer 110 can predict that the future location of the moveable object 400 is the current location of the moveable object 400. The vehicle computer 110 can then compare the future location to the planned path P of the vehicle 105. Upon predicting that the future location of the moveable object 400 will not intersect the planned path P of the vehicle 105, the vehicle computer 110 is programmed to operate the vehicle 105 along the planned path P. For example, the vehicle computer 110 can actuate one or more vehicle components 125 to move the vehicle 105 along the planned path P.

Upon predicting that the future location of the moveable object 400 will intersect the planned path P of the vehicle 105, the vehicle computer 110 can be programmed to determine an egress distance $D_e$ that the vehicle 105 has moved along the planned path P. That is, the egress distance $D_e$ is a distance along the planned path P from the first end of the straight portion $P_s$, i.e., the first location, to a location of the vehicle 105 at which the vehicle computer 110 makes the prediction. Thus, the egress distance $D_e$ can be any distance along the planned path P, depending on where the computer 110 makes the prediction. The vehicle computer 110 can then be programmed to continue operating the vehicle 105 along the planned path P or to operate the vehicle 105 a stop based on the egress distance $D_e$, as discussed further below. Additionally, the vehicle computer 110 can be programmed to continue operating the vehicle 105 along the planned path P or to operate the vehicle 105 to a stop based on preventing the vehicle 105 from impacting the moveable object 400, e.g., using collision avoidance techniques.

The vehicle computer 110 can determine the egress distance $D_e$ based on sensor 115 data. For example, upon making the prediction, the vehicle computer 110 can determine a current location of the vehicle 105. The vehicle computer 110 may determine the current location, e.g., GPS (Global Positioning System) location coordinates, of the vehicle 105 relative to a coordinate system, e.g., based on data received from GPS sensor 115. Alternatively, the vehicle computer 110 can receive the current location of the vehicle 105 from the server 140, e.g., via the network 135. The vehicle computer 110 can then compare the current location, e.g., GPS location coordinates, to the first location, e.g., GPS location coordinates, to determine the egress distance $D_e$. As another example, the vehicle computer 110 can receive sensor 115 data that indicates a number of revolutions of wheels of the vehicle 105 since the vehicle 105 moved from the first location. The vehicle computer 110 can then determine the egress distance $D_e$ using geometric functions based on a diameter of the wheels. The vehicle computer 110 can store the diameter of the wheels, e.g., in a memory.

The vehicle computer 110 can be programmed to compare the egress distance $D_e$ to a first threshold. The first threshold is a distance along the planned path P from the first end of the straight portion Ps, i.e., the first location, within which the vehicle 105 is supposed to stop. Stopping the vehicle 105 when the egress distance $D_e$ is within the first threshold prevents the vehicle 105 from impeding a path of the moveable object 400 or impacting the moveable object 400. The first threshold may be determined based on, e.g., empirical testing to determine a distance within which the vehicle computer 110 does not have to move the vehicle 105 toward the first location, i.e., in an opposite direction, to avoid impeding or intersecting a path of the moveable object 400 (e.g., based on dimensions of the vehicle 105 and moveable object 400 and the width $w_t$ of the travel route). The vehicle computer 110 can store the first threshold, e.g., in a memory.

In the case that the egress distance $D_e$ is less than or equal to the first threshold, the vehicle computer 110 operates the vehicle 105 to a stop. For example, the vehicle computer 110 can actuate one or more vehicle components 125 to stop the vehicle 105 along the planned path P at the current location of the vehicle 105. In the case that the egress distance $D_e$ is greater than the first threshold, the vehicle computer 110 may operate the vehicle 105 along the planned path P or to a new location, as discussed further below.

The vehicle computer 110 can be programmed to compare the egress distance $D_e$ to a second threshold. The second threshold is greater than the first threshold. The second threshold is a distance along the planned path P from the first end of the straight portion $P_s$ beyond which the vehicle 105 is supposed to continue operating to the second end of the turning portion $P_t$. Continuing to operate the vehicle 105 when the egress distance $D_e$ is beyond, i.e., greater than, the second threshold reduces an amount of time that the vehicle 105 impedes the moveable object 400. The second threshold may be determined based on, e.g., empirical testing to determine a distance at which the vehicle 105 is closer to the second end of the turning portion $P_t$ than to a new location (discussed further below) that does not impede or intersect the path of the moveable object 400 (e.g., assuming that the vehicle computer 110 operates the vehicle 105 at a same speed to the second end of the turning portion $P_t$ or to the new location). The vehicle computer 110 can store the second threshold, e.g., in a memory.

In the case that the egress distance $D_e$ is greater than the second threshold, the vehicle computer 110 operates the vehicle 105 along the planned path P. For example, the vehicle computer 110 can actuates one or more vehicle components 125 to move the vehicle 105 to the second end of the turning portion $P_t$. In the case that the egress distance $D_e$ is less than or equal to the second threshold, the vehicle computer 110 may operate the vehicle 105 along the planned path P or to a new location, as discussed further below.

While stopped at the current location, the vehicle computer 110 can determine whether the moveable object 400 has moved or changed paths. The vehicle computer 110 can, for example, compare a location of the moveable object 400, e.g., obtained via second image data, to the planned path P of the vehicle 105. In the case that the moveable object 400 has moved and is not intersecting the planned path P, the vehicle computer 110 can operate the vehicle along the planned path P. In the case that the moveable object 400 has not moved, or is still intersecting the planned path P, the vehicle computer 110 can maintain the vehicle 105 stopped at the current location.

Figure 5:
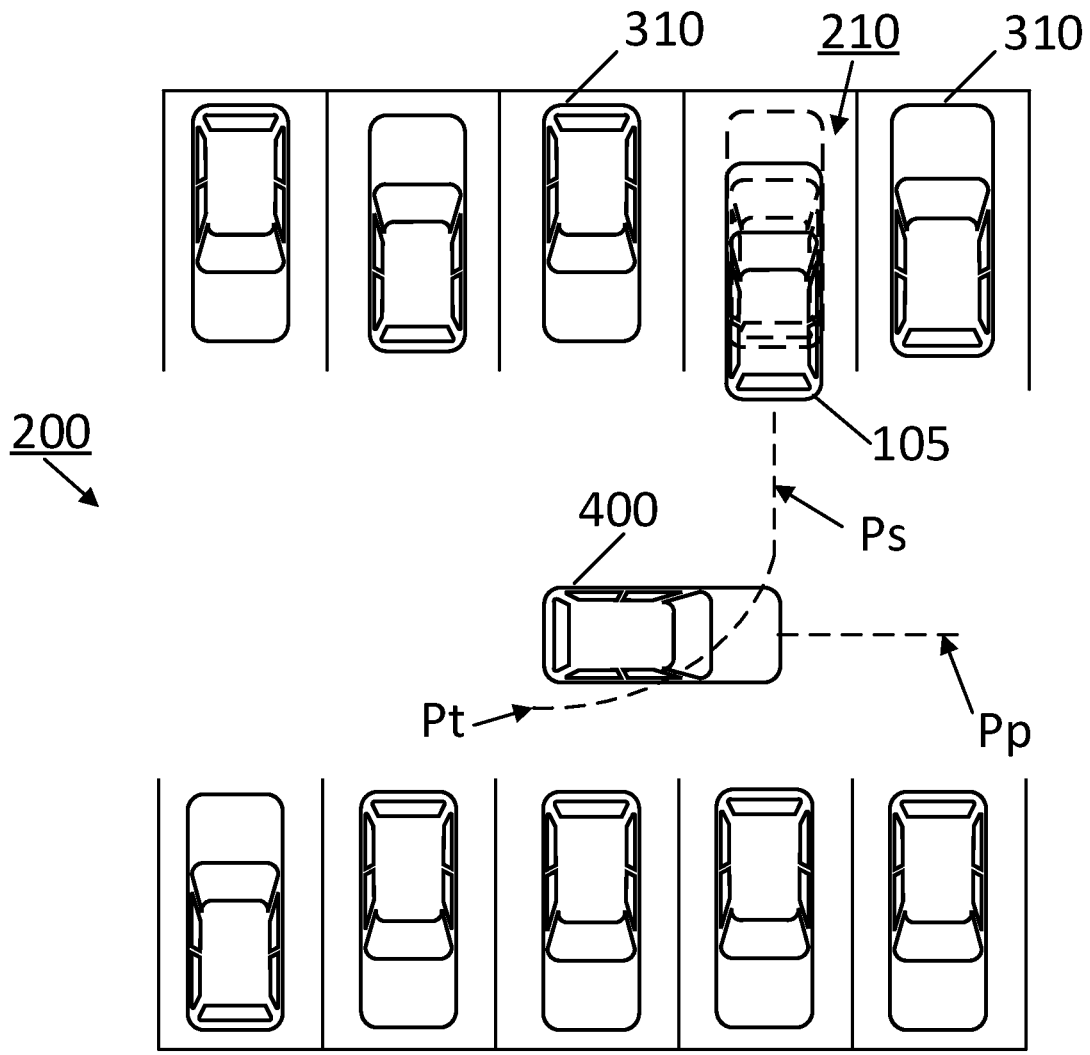
FIG. 5 is a diagram of the vehicle in a second location based on an egress distance being below a first threshold.

Turning now to FIG. 5, based on determining that the egress distance $D_e$ is between the first threshold and the second threshold, the vehicle computer 110 can be programmed to operate the vehicle 105 along the planned path P or to a new location based on a distance $D_o$ between the vehicle 105 and the moveable object 400.

The new location is a location along the planned path P at which the vehicle 105 does not impede or intersect a path of the moveable object 400. The new location (vehicle 105 shown in solid lines in FIG. 5) is different from the first location (vehicle 105 shown in broken lines in FIG. 5). For example, the vehicle 105 may extend partially into the travel route, i.e., across a boundary of the travel route that partly defines the first lane, when the vehicle 105 is at the new location. That is, the vehicle 105 may be partly in the sub-area 210 and partly in the travel route at the new location. Conversely, the vehicle 105 may be within, i.e., between conventional markings of, the sub-area 210 and outside of the travel route, when the vehicle 105 is at the first location.

The vehicle computer 110 can determine the distance $D_o$ between the vehicle 105 and the moveable object 400 based on second sensor 115 data. For example, the vehicle computer 110 can determine the distance $D_o$ based on free space computation techniques, as set forth above. As another example, a lidar sensor 115 can emit a light beam and receive a light beam reflected from the moveable object 400. The vehicle computer 110 can measure a time elapsed from emitting the light beam to receiving the reflected light beam. Based on the time elapsed and the speed of light, the vehicle computer 110 can determine the distance $D_o$ between the vehicle 105 and the moveable object 400.

The vehicle computer 110 can then compare the distance $D_o$ to a specified distance. The specified distance specifies a distance between the vehicle 105 and the moveable object 400 within which the vehicle 105 is supposed to move to the new location. Moving the vehicle 105 to the new location when the distance $D_o$ is within the specified distance prevents the vehicle 105 from impacting the moveable object 400. The specified distance may be determined based on, e.g., empirical testing to determine a minimum distance between the vehicle 105 and the moveable object 400 at which the vehicle computer 110 can prevent the vehicle 105 from impacting the moveable object 400 (e.g., based on dimensions of the vehicle 105 and moveable object 400, a speed of the moveable object 400, etc.). The vehicle computer 110 can store the specified distance, e.g., in a memory.

In the case that the distance $D_o$ is greater than the specified distance, the vehicle computer 110 is programmed to operate the vehicle 105 along the planned path P. In the case that the distance $D_o$ is less than or equal to the specified distance, the vehicle computer 110 is programmed to operate the vehicle 105 to the new location. That is, the vehicle computer 110 operates the vehicle 105 to move in an opposite direction along the planned path P to the new location. For example, the vehicle computer 110 can actuate one or more vehicle components 125 to move the vehicle 105 to the new location.

The vehicle computer 110 can determine the new location of the vehicle 105 based on the travel route. For example, the vehicle computer 110 can determine the new location at which a distance between the vehicle 105 and the boundary of the travel route that partly defines the second lane is above a threshold. The vehicle computer 110 may determine the threshold based on a width of the moveable object 400. That is, the threshold is greater than the width of the moveable object 400. Additionally, or alternatively, the vehicle computer 110 can determine the new location based on one or more objects 310 around the vehicle 105 at the first location, i.e., one or more objects 310 in adjacent sub-areas 210. For example, the vehicle computer 110 can determine the new location such that the vehicle computer 110 can receive second sensor 115 data of the travel route while the vehicle 105 is at the new location. For example, the vehicle computer 110 can determine the new location at which the fields of view F of at least some sensors 115 of the vehicle 105 encompass an area of the travel route that extends to the right and to the left of the sub-area 210, e.g., an area behind object(s) 310 in adjacent sub-areas 210.

While at the new location, the vehicle computer 110 can determine whether the moveable object 400 has moved or changed paths. The vehicle computer 110 can, for example, compare a location of the moveable object 400, e.g., obtained via second image data, to the planned path P of the vehicle 105. In the case that the moveable object 400 has moved and is not intersecting the planned path P, the vehicle computer 110 can operate the vehicle along the planned path P. In the case that the moveable object 400 has not moved, or is still intersecting the planned path P, the vehicle computer 110 can maintain the vehicle 105 at the new location.

Figure 6A:
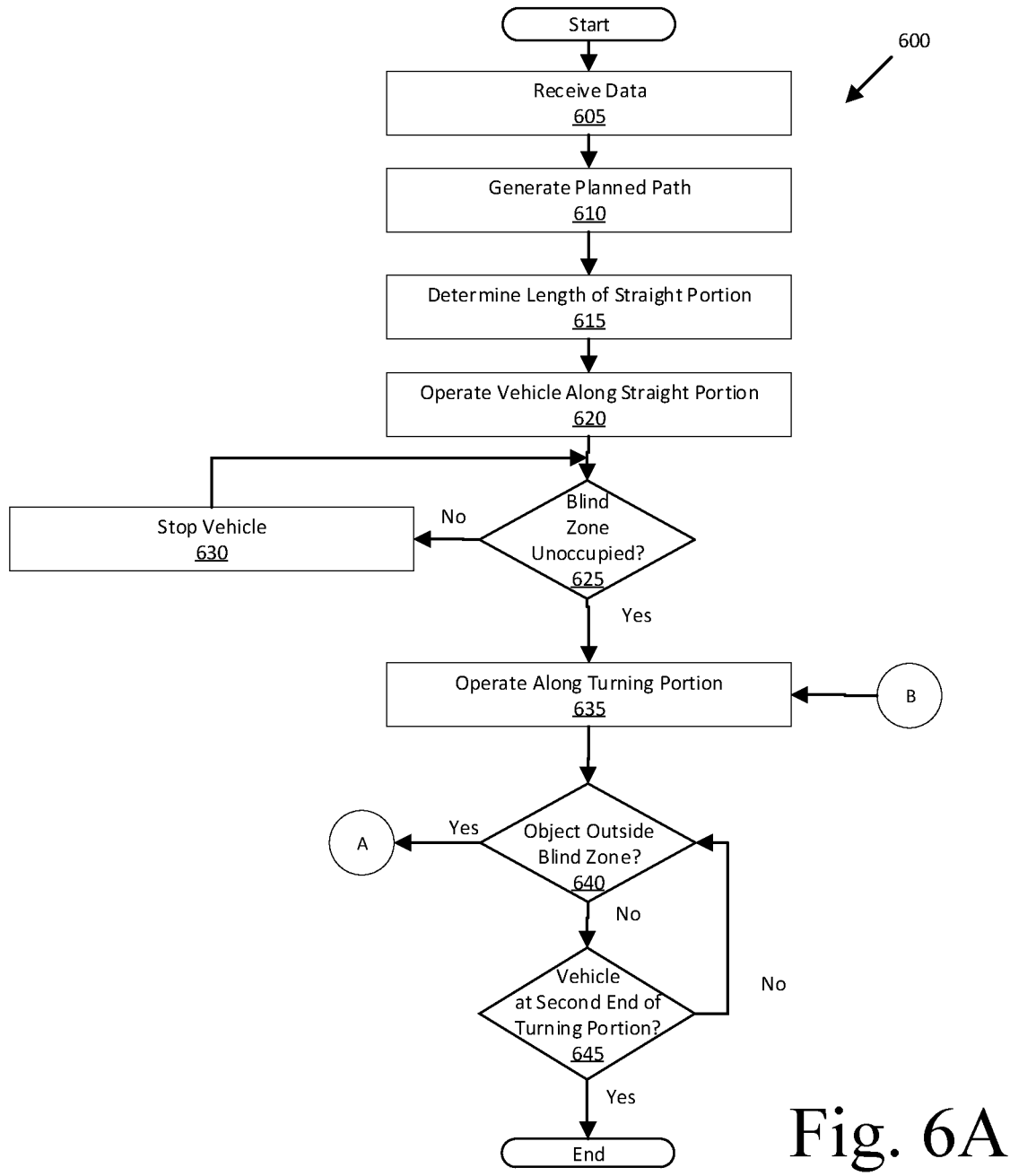
FIG. 6A is a first part of a flowchart of an example process for operating the vehicle.

FIG. 6A is a first portion of a flowchart of an example process 600 (the second portion being shown in FIG. 6B because the entire flowchart will not fit on a single drawing sheet) for operating a vehicle 105 in an area 200. The process 600 begins in the block 605. The process 600 can be carried out by a vehicle computer 110 executing program instructions stored in a memory thereof.

In the block 605, the vehicle computer 110 receives data from one or more sensors, e.g., via a vehicle network, and/or from a remote server computer 140, e.g., via a network 135. For example, the vehicle computer 110 can receive location data of the vehicle, e.g., from a sensor 115, a navigation system, etc., specifying a first location of the vehicle 105. Additionally, the vehicle computer 110 can receive image data, e.g., from one or more image sensors 115. The image data may include data about the environment around the vehicle 105, e.g., the area 200, a sub-area 210, one or more objects 310, etc. The vehicle computer 110 can define a blind zone 300 for the vehicle 105 at the first location, e.g., when parked in a sub-area 210, based on fields of view F of the sensors 115, as discussed above. The process 600 continues in a block 610.

In the block 610, the vehicle computer 110 generates a planned path P to direct the vehicle 105 away from the first location, i.e., out of the sub-area 210, along a travel route to depart the area 200. The vehicle computer 110 can generate the planned path P, e.g., via navigation and/or path planning algorithms, as discussed above. The planned path P includes a straight portion $P_s$ and a turning portion $P_t$, as discussed above. The process 600 continues in a block 615.

In the block 615, the vehicle computer 110 determines a length of the straight portion $P_s$ based on the blind zone 300.

For example, the vehicle computer 110 can determine the length of the straight portion $P_s$ as at least equal to a length of the blind zone 300, as discussed above, which allows the fields of view F of the sensors 115 to encompass the blind zone 300 for the vehicle 105 at the first location when the vehicle 105 is at a second end of the straight portion $P_s$. Additionally, the vehicle computer 110 can determine the length of the straight portion $P_s$ based on parameters of the vehicle 105, objects 310 around the vehicle 105 at the first location, and a travel direction in the travel route, as discussed above. The process 600 continues in a block 620.

In the block 620, the vehicle computer 110 operates the vehicle 105 along the straight portion $P_s$ of the planned path P. That is, the vehicle computer 110 operates the vehicle 105 from the first end of the straight portion $P_s$ towards the second end of the straight portion $P_s$. For example, the vehicle computer 110 actuates one or more vehicle components 125 to move the vehicle 105 along the straight portion $P_s$ of the planned path P. Additionally, the vehicle computer 110 may operate the vehicle 105 along the straight portion $P_s$ after a predetermined time, as discussed above. The process 600 continues in a block 625.

In the block 625, the vehicle computer 110 determines whether the blind zone 300 for the vehicle 105 at the first location is unoccupied. For example, the vehicle computer 110 can receive sensor 115 data, e.g., image data, of the blind zone 300 for the vehicle at the first location while operating the vehicle 105 along the straight portion $P_s$ of the planned path P. The image data can include an object 320 that is in the blind zone 300 for the vehicle 105 at the first location. The vehicle computer 110 can the determine whether the blind zone 300 is occupied or unoccupied based on sensor 115 data indicating a presence or absence of an object 320 in the blind zone 300, as discussed above. If an object 320 is in the blind zone 300, i.e., the blind zone 300 is occupied, then the process 600 continues in a block 630. If an object 320 is not in the blind zone 300, i.e., the blind zone 300 is unoccupied, then the process 600 continues in a block 635.

In the block 630, the vehicle computer 110 operates the vehicle 105 to a stop. For example, the vehicle computer 110 actuates one or more vehicle components 125 to stop the vehicle 105. The process 600 returns to the block 625.

In the block 635, the vehicle computer 110 operates the vehicle 105 along the turning portion $P_t$ of the planned path P. For example, the vehicle computer 110 actuates one or more vehicle components 125 to move the vehicle 105 along the turning portion $P_t$ of the panned path P. The process 600 continues in a block 640.

In the block 640, the vehicle computer 110 determines whether a moveable object 400 is in the travel route. For example, the vehicle computer 110 can receive second sensor 115 data, e.g., second image data, of the environment outside the blind zone 300 while operating the vehicle 105 along the planned path P. The second image data can include an object 400 that is in the travel route, i.e., outside of the blind zone 300 for the vehicle 105 at the first location. The vehicle computer 110 can then identify a moveable object 400 based on output from the classifier, as discussed above. If the vehicle computer 110 detects a moveable object 400 in the travel route, then the process 600 continues in a block 645. If the vehicle computer 110 does not detect a moveable object 400 in the travel route, then the process 600 continues in a block 650.

In the block 645, the vehicle computer 110 determines whether the vehicle 105 is at a second end of the turning portion $P_t$. For example, the vehicle computer 110 can receive location data, e.g., from a sensor 115, a navigation system, the server 140, etc., that specifies a current location of the vehicle 105. The vehicle computer 110 can then compare the current location of the vehicle 105 to a location of the second end of the turning portion $P_t$. If the vehicle 105 is not at the second end of the turning portion $P_t$, then the process 600 returns to the block 640. If the vehicle 105 is at the second end of the turning portion $P_t$, then the vehicle computer 110 operates the vehicle 105 along the planned path P to depart the area 200 and the process 600 ends.

Figure 6B:
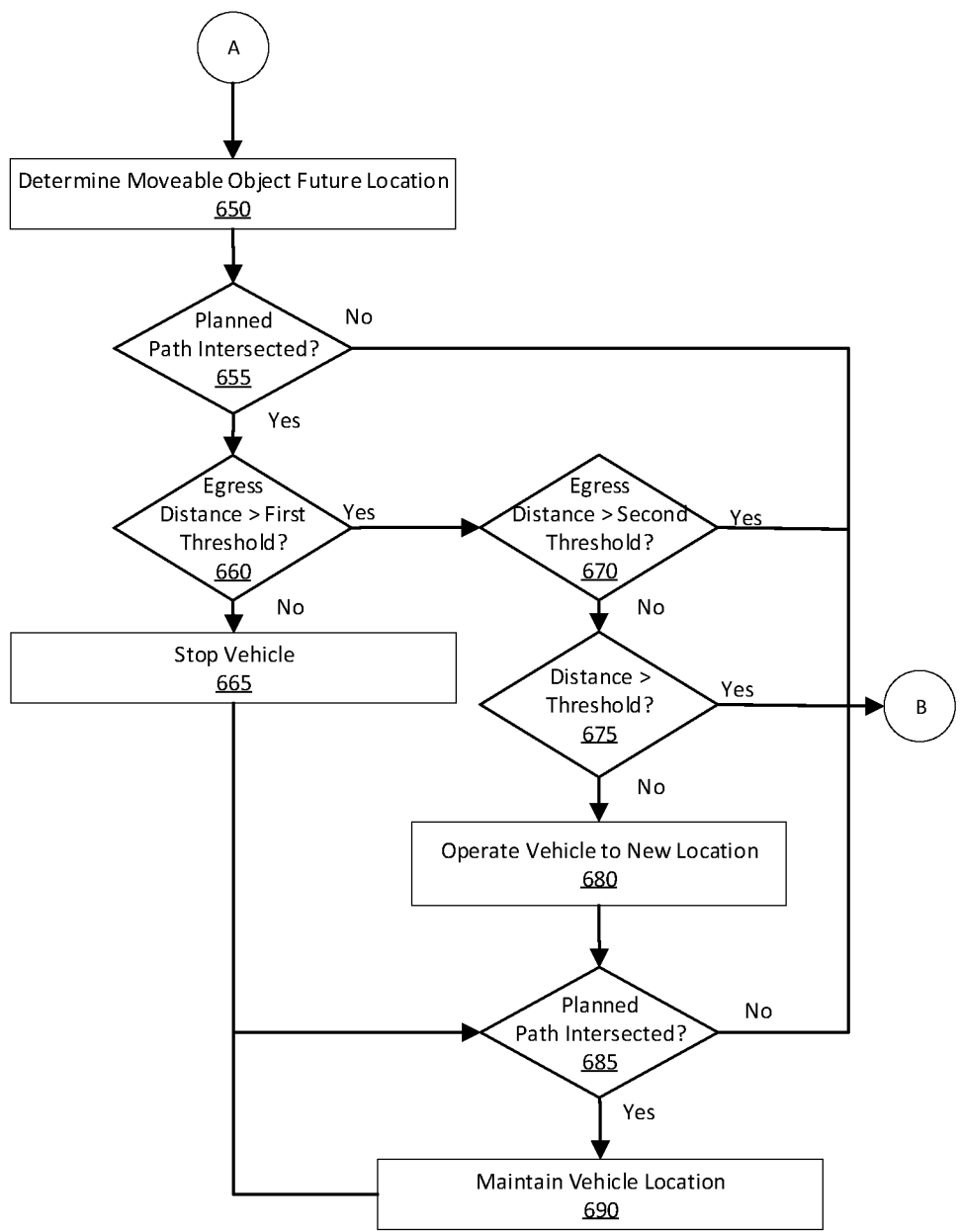
FIG. 6B is a second part of the flowchart of FIG. 6A.

Turning now to FIG. 6B, following the block 640 shown in FIG. 6A, in the block 650, the vehicle computer 110 determines a future location of the moveable 400. For example, the vehicle computer 110 can determine the future location of the moveable object 400 based on second sensor 115 data, e.g., sequential frames of image data, as discussed above. For example, in the case that the moveable object 400 is moving, the vehicle computer 110 can determine a predicted path Pp of the movable object 400 based on identifying a direction of movement of the moveable object 400 via second sensor 115 data. As another example, in the case that the moveable object 400 is stationary, the vehicle computer 110 can determine the future location is a current location of the moveable object 400. The process 600 continues in a block 655.

In the block 655, the vehicle computer 110 determines whether the planned path P of the vehicle 105 will intersect the future location of the moveable object 400. For example, in the case that the moveable object 400 is moving, the vehicle computer 110 can compare the predicted path Pp of the moveable object 400 to the planned path P of the vehicle 105. As another example, in the case that the moveable object 400 is stationary, the vehicle computer 110 can compare the current location of the moveable object 400 to the planned path P of the vehicle 105. If the vehicle computer 110 predicts that the future location of the moveable object 400 will not intersect the planned path P of the vehicle 105, then the process 600 continues returns to the block 635. If the vehicle computer 110 predicts that the future location of the moveable object 400 will intersect the planned path P of the vehicle 105, then the process 600 continues in a block 660.

In the block 660, the vehicle computer 110 determines whether an egress distance $D_e$ is greater than a first threshold. That is, the vehicle computer 110 compares first threshold to the egress distance $D_e$. For example, the vehicle computer 110 can determine the egress distance $D_e$ based on a current location of the vehicle 105 when the vehicle computer 110 makes the prediction, as discussed above. For example, the vehicle computer 110 can then compare the current location, e.g., GPS location coordinates, to the first location, e.g., GPS location coordinates, to determine the egress distance $D_e$. If the egress distance $D_e$ is less than or equal to the first threshold, then the process 600 continues in a block 665. If the egress distance $D_e$ is greater than the first threshold, then the process 600 continues in a block 670.

In the block 665, the vehicle computer 110 operates the vehicle 105 to a stop. For example, the vehicle computer 110 actuates one or more vehicle components 125 to stop the vehicle 105. The process 600 continues in a block 685.

In the block 670, the vehicle computer 110 determines whether the egress distance $D_e$ is greater than a second threshold. That is, the vehicle computer 110 compares the egress distance $D_e$ to the second threshold. The second threshold is greater than the first threshold, as set forth above. If the egress distance $D_e$ is greater than the second threshold, then the process 600 returns to the block 635. If the egress distance $D_e$ is less than or equal to the second threshold, then the process 600 continues in a block 675.

In the block 675, the vehicle computer 110 determines whether a distance $D_o$ between the moveable object 400 and the vehicle 105 is greater than a specified distance. That is, the vehicle computer 110 can compare the distance $D_o$ to the specified distance. For example, the vehicle computer 110 can determine the distance $D_o$ based on sensor 115 data, as discussed above. If the distance $D_o$ is greater than the specified distance, then the process 600 returns to the block 635. If the distance is less than or equal to the specified distance, then the process 600 continues in a block 680.

In the block 680, the vehicle computer 110 operates the vehicle 105 to a new location. For example, the vehicle computer 110 can actuate one or more vehicle components 125 to move the vehicle 105 in an opposite direction along the planned path P to the new location. The vehicle computer 110 can determine the new location based on the travel route and/or one or more objects 310 around the vehicle 105 at the first location, i.e., one or more objects 310 in adjacent sub-areas 210, as discussed above. The process 600 continues in a block 685.

In the block 685, the vehicle computer 110 determines whether the moveable object 400 is intersecting the planned path P of the vehicle 105. For example, the vehicle computer 110 can compare a location of the moveable object 400, e.g., obtained via second image data, to the planned path P of the vehicle 105. If the moveable object 400 has moved and is not intersecting the planned path P, then the process 600 returns to the block 635. If the moveable object 400 has not moved, or is still intersecting the planned path P, then the process 600 continues in a block 690.

In the block 690, the vehicle computer 110 maintains the vehicle 105 at a current location. For example, the vehicle computer 110 can actuate one or more vehicle components 125 to maintain the vehicle 105 at the current location. The current location is the location at which the vehicle computer 110 stopped the vehicle 105, e.g., the new location or some other location along the planned path P. The process 600 returns to the block 685.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   for a vehicle at a first location, define a blind zone that is outside fields of view of available vehicle sensors;
   determine a path that avoids the blind zone and moves the vehicle away from the first location, the path including a straight portion having a first end at the first location, and a turning portion starting at a second end of the straight portion, wherein the straight portion is defined such that, at the second end of the straight portion, the fields of view encompass the blind zone;
   upon detecting an object outside of the blind zone, predict that a future location of the object will intersect the path;
   determine a distance the vehicle has moved along the path; and
   then operate the vehicle (a) to a stop based on the distance being less than a first threshold, or (b) along the path based on the distance being greater than a second threshold.

2. The system of claim 1, wherein the instructions further include instructions to, upon detecting an object in the blind zone based on the sensor data, operate the vehicle to a stop.

3. The system of claim 2, wherein the instructions further include instructions to operate the vehicle along the path based on determining that the object has moved out of the blind zone.

4. The system of claim 1, wherein the instructions further include instructions to, upon determining the blind zone is unoccupied based on the sensor data, operate the vehicle along the turning portion.

5. The system of claim 1, wherein the instructions further include instructions to, upon determining the distance is between the first and second thresholds, move the vehicle (a) to a second location based on a distance from the object to the vehicle being within a specified distance, or (b) along the path based on the distance from the object to the vehicle being outside the specified distance.

6. The system of claim 5, wherein the instructions further include instructions to determine the second position based on an object adjacent to the blind zone.

7. The system of claim 1, wherein the future location is defined in part by a path of the object.

8. The system of claim 1, wherein the object is one of a vehicle or a pedestrian.

9. The system of claim 1, wherein the instructions further include instructions to determine the straight portion of the path based further on an object adjacent to the blind zone.

10. The system of claim 1, wherein the instructions further include instructions to determine the turning portion of the path based on a width of a travel route.

11. The system of claim 1, wherein the instructions further include instructions to determine the turning portion of the path based on a maximum steering angle of the vehicle.

12. The system of claim 1, wherein the instructions further include instructions to, upon determining the path, operate the vehicle along the straight portion of the path after a predetermined time.

13. The system of claim 1, wherein the instructions further include instructions to operate the vehicle along the turning portion based on obtaining sensor data from the blind zone upon reaching the end of the straight portion.

14. A method, comprising:
   for a vehicle at a first location, defining a blind zone that is outside fields of view of available vehicle sensors;
   determining a path that avoids the blind zone and moves the vehicle away from the first location, the path including a straight portion starting at the first location, and a turning portion starting at an end of the straight portion, wherein the straight portion is defined such that, at the end of the straight portion the fields of view encompass the blind zone;
   upon detecting an object outside of the blind zone, predicting that a future location of the object will intersect the path;
   determining an egress distance the vehicle has moved along the path; and
   operating the vehicle to (a) a stop based on the distance being less than a first threshold, or (b) along the path based on the distance being greater than a second threshold, wherein the second threshold is greater than the first threshold.

15. The method of claim 14, further comprising, upon detecting an object in the blind zone based on the sensor data, operating the vehicle to a stop.

16. The method of claim 15, further comprising operating the vehicle along the path based on determining that the object has moved out of the blind zone.

17. The method of claim 14, further comprising, upon determining the blind zone is unoccupied based on the sensor data, operating the vehicle along the turning portion.

18. The method of claim 14, further comprising:
   upon determining the distance is between the first and second thresholds, moving the vehicle (a) to a second location based on a distance from the object to the vehicle being within a specified distance, or (b) along the path based on the distance from the object to the vehicle being outside the specified distance.

19. The method of claim 18, further comprising determining the second position based on an object adjacent to the blind zone.

20. The method of claim 14, further comprising operating the vehicle along the turning portion based on obtaining sensor data from the blind zone upon reaching the end of the straight portion.

* * * * *